United States Patent
Kim et al.

(10) Patent No.: US 12,407,033 B2
(45) Date of Patent: Sep. 2, 2025

(54) APPARATUS AND METHOD FOR DETECTING DAMAGE TO BATTERY PACK CASE

(71) Applicant: LG ENERGY SOLUTION, LTD., Seoul (KR)

(72) Inventors: Jeong Wook Kim, Daejeon (KR); Seog Jin Yoon, Daejeon (KR); Seung Jin Noh, Daejeon (KR); Hyo Seong An, Daejeon (KR); Won Hoe Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 537 days.

(21) Appl. No.: 17/777,140

(22) PCT Filed: Dec. 30, 2020

(86) PCT No.: PCT/KR2020/019422
§ 371 (c)(1),
(2) Date: May 16, 2022

(87) PCT Pub. No.: WO2021/141323
PCT Pub. Date: Jul. 15, 2021

(65) Prior Publication Data
US 2022/0399584 A1    Dec. 15, 2022

(30) Foreign Application Priority Data
Jan. 10, 2020    (KR) .................... 10-2020-0003824

(51) Int. Cl.
*H01M 10/48* (2006.01)
*H01M 10/42* (2006.01)
(Continued)

(52) U.S. Cl.
CPC ....... *H01M 10/482* (2013.01); *H01M 10/425* (2013.01); *H01M 50/204* (2021.01); *H01M 50/569* (2021.01); *H01M 2010/4271* (2013.01)

(58) Field of Classification Search
CPC ............ H01M 10/482; H01M 10/425; H01M 50/569; H01M 50/204; H01M 2010/4271
See application file for complete search history.

(56) References Cited

U.S. PATENT DOCUMENTS 5,577,569 A * 11/1996 Nakashima ............ B60K 28/14
                                                    180/277
6,090,501 A *  7/2000 Souliac ............... H01M 50/574
                                                    429/61
(Continued)

FOREIGN PATENT DOCUMENTS

CN         103633682 A    3/2014
JP         2001-102092 A  4/2001
(Continued)

OTHER PUBLICATIONS

Machin Translation of KR-0164337-B1 (May 15, 2025) (Year: 2025).*
International Search Report (PCT/ISA/210) issued in PCT/KR2020/019422, dated Apr. 12, 2021.

*Primary Examiner* — Matthew J Merkling
(74) *Attorney, Agent, or Firm* — Birch, Stewart, Kolasch & Birch, LLP

(57) ABSTRACT

A battery pack according to an embodiment includes a case in which a plurality of battery cells are accommodated, and a battery management system (BMS) for detecting damage to the case, wherein the BMS includes a voltage output terminal for outputting a predetermined voltage, a ground terminal, and a voltage measurement terminal for measuring voltage, wherein the case includes a conductive member having a first end connected to the voltage output terminal (Continued)

of the BMS and a second end connected to the ground terminal of the BMS, and a sensing wire having a first end connected to the conductive member and a second end connected to a voltage measurement terminal of the BMS, the conductive member being provided between one surface inside the case and the other surface opposite to the one surface.

8 Claims, 3 Drawing Sheets

(51) Int. Cl.
*H01M 50/204* (2021.01)
*H01M 50/569* (2021.01)

(56) References Cited

U.S. PATENT DOCUMENTS

| | | |
|---|---|---|
| 6,100,702 A | 8/2000 | Hagen et al. |
| 6,111,327 A * | 8/2000 | Bae .................. H01H 3/503 200/558 |
| 9,368,783 B2 * | 6/2016 | Hjerpe .................... B60L 58/21 |
| 10,052,956 B2 * | 8/2018 | Lim ......................... B60L 3/04 |
| 2004/0257031 A1 | 12/2004 | Kang |
| 2006/0093896 A1 | 5/2006 | Hong et al. |
| 2011/0156714 A1 * | 6/2011 | Mizoguchi ........... G01R 31/396 324/434 |
| 2015/0234012 A1 | 8/2015 | Iwase |

FOREIGN PATENT DOCUMENTS

| | | |
|---|---|---|
| JP | 2007-59279 A | 3/2007 |
| JP | 2008-258110 A | 10/2008 |
| JP | 2009-4373 A | 1/2009 |
| JP | 2008-110744 A | 5/2009 |
| JP | 2012-154860 A | 8/2012 |
| JP | 5365705 B2 | 12/2013 |
| JP | 2014-67614 A | 4/2014 |
| JP | 2016-129178 A | 7/2016 |
| JP | 2017-111958 A | 6/2017 |
| KR | 0164337 B1 * | 1/1999 |
| KR | 10-2008-0037841 A | 5/2006 |
| KR | 10-2016-0085559 A | 7/2016 |
| KR | 10-2017-0046449 A | 5/2017 |
| KR | 10-2046707 B1 | 11/2019 |

* cited by examiner (a)

(b)

APPARATUS AND METHOD FOR DETECTING DAMAGE TO BATTERY PACK CASE

TECHNICAL FIELD

The present invention relates to a device and method for detecting damage to a battery pack case due to external impact.

More specifically, the present invention relates to a device and method for providing a conductor inside a battery pack and detecting damage to a battery pack case based on a voltage measured at the conductor.

BACKGROUND ART

Flat-type batteries such as lithium ion batteries are generally used by being housed in a case made of metal or plastic because they are covered with an exterior material such as a laminate film and are fragile. Recently, a plurality of batteries are electrically connected in series or parallel as a power source for vehicles such as electric vehicles and hybrid vehicles and a battery pack with high output and high capacity is used, and this battery pack is also housed in the case.

Typically, the battery pack does not separately detect damage to the case of the battery pack, as long as the electrical connection in the battery management system (BMS) is normal.

On the other hand, if damage occurs to the case in which the battery pack is housed, foreign matter may flow into the damaged part, and problems such as ignition or explosion may occur in the battery pack due to the material introduced from the outside.

Accordingly, the present invention proposes a device and method for detecting damage to a battery pack case.

PRIOR TECHNICAL LITERATURE

Patent Literature (Patent Document 0001) Japanese Published Patent Publication JP 2007-059279 A

DISCLOSURE

Technical Problem

The present invention provides a battery pack and a detection method capable of detecting physical damage to a battery pack case due to an external shock.

Technical Solution

A battery pack according to an embodiment of the present invention includes a case accommodating a plurality of battery cells; and a battery management system (BMS) configured to detect damage to the case, wherein the BMS includes a voltage output terminal configured to output a predetermined voltage, a ground terminal, and a voltage measurement terminal configured to measure voltage.

The case includes a conductive member having a first end connected to the voltage output terminal of the BMS and a second end connected to the ground terminal of the BMS, and a sensing wire having a first end connected to the conductive member and a second end connected to a voltage measurement terminal of the BMS, wherein the conductive member may be provided between a first surface inside the case and a second surface opposite to the first surface.

In the conductive member, a first conductive member and a second conductive member identical to each other are connected in series.

The first end of the sensing wire may be positioned between the center of the conductive member or between the first conductive member and the second conductive member.

The conductive member may be sealed with an insulating material.

A first spring may be provided between the first end of the conductive member and the first surface of the case, wherein a second spring may be provided between the second end of the conductive member and the second surface of the case.

In response to a voltage $V_c$ received from the voltage measurement terminal of the BMS being equal to a reference voltage $V_{ref}$, the BMS determines that there is no damage to a battery pack case, and in response to the voltage $V_c$ received from the voltage measurement terminal of the BMS being different from the reference voltage $V_{ref}$, the BMS determines that there is damage to the battery pack case, wherein the reference voltage $V_{ref}$ is calculated by the following (Equation):

$$V_{ref} = V_{in} * \frac{R_2}{R_1 + R_2}.$$ (Equation)

$$V_{ref} = \frac{V_{in}}{\frac{R_1}{R_1 + R_2}}.$$

($V_{in}$=voltage outputted from the voltage output terminal, $R_1$=resistance of the first conductive member, $R_2$=resistance of the second conductive member).

Meanwhile, the battery pack according to the embodiment of the present invention described above may be mounted on various devices and used as a power source for devices.

The device is any one selected from the group consisting of a mobile phone, a tablet computer, a notebook computer, a power tool, a wearable electronic device, an electric vehicle, a hybrid electric vehicle, a plug-in hybrid electric vehicle, and a power storage device.

Moreover, a method of detecting damage to a case of a battery pack in the battery pack according to the above-mentioned embodiment of the present invention includes a voltage application step of applying a predetermined voltage to a conductive member in a BMS; a voltage measurement step of measuring a voltage applied to a sensing wire in which a first end is connected to the center of a conductive member to which the predetermined voltage is applied, and a second end is connected to a voltage measurement terminal of the BMS in the BMS; and a case damage determination step of determining whether the battery pack is damaged based on the measured voltage.

The case damage determination step determines that there is no damage to the battery pack case in response to the voltage $V_c$ measured in the voltage measurement step being the same as the reference voltage $V_{ref}$, and determines that there is damage to the battery pack case in response to the voltage measured in the voltage measurement step being different from the reference voltage $V_{ref}$, wherein the reference voltage $V_{ref}$ is calculated by the following (Equation):

$$V_{ref} = V_{in} * \frac{R_2}{R_1 + R_2}.$$ (Equation)

-continued $$V_{ref} = \frac{V_{in}}{\frac{R_1}{R_1 + R_2}}.$$

($V_{in}$=voltage outputted from the voltage output terminal, $R_1$=resistance of the first conductive member, $R_2$=resistance of the second conductive member).

Advantageous Effects

The present invention can detect physical damage to a battery pack case due to external impact.

In addition, according to the present invention, by detecting physical damage to the battery pack case due to an external impact, problems such as ignition and explosion of the battery pack due to physical damage to the battery pack case can be prevented.

MODE FOR INVENTION

Figure 1:
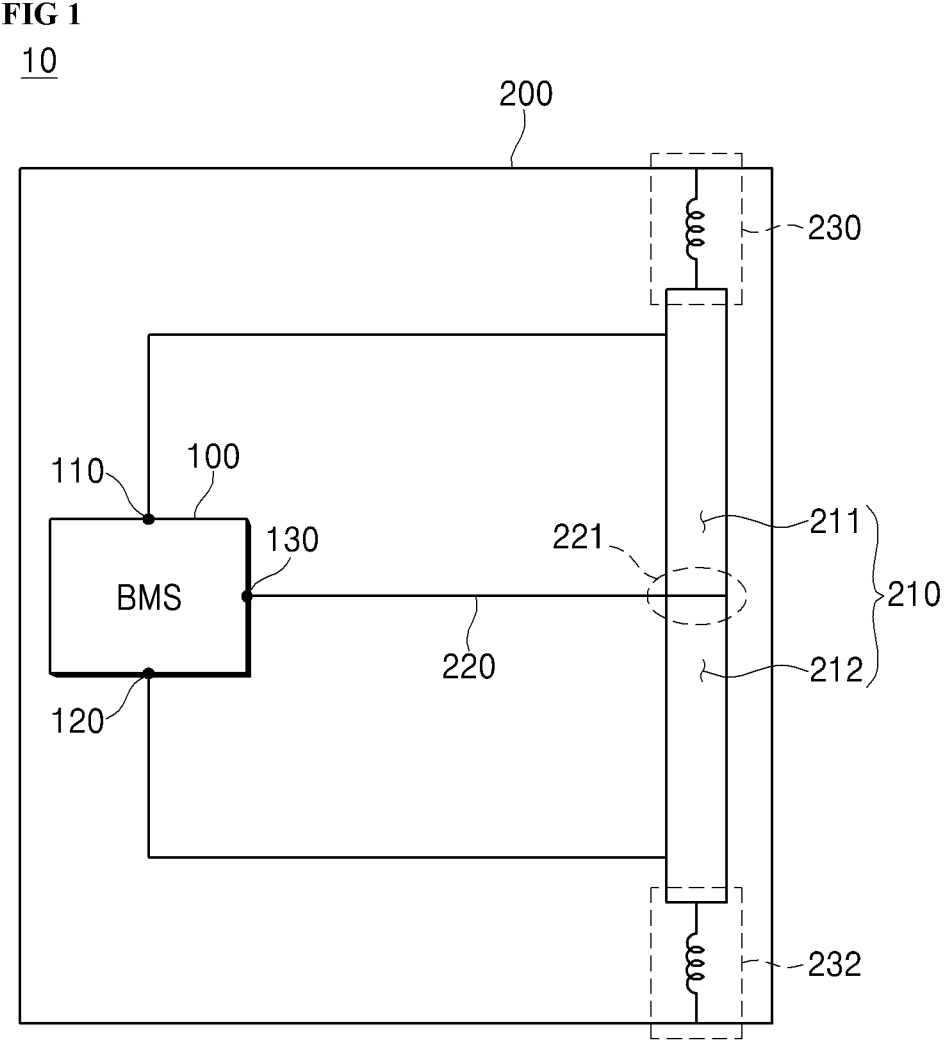
FIG. 1 is a cross-sectional view of a battery pack according to an embodiment of the present invention.

Hereinafter, embodiments of the present invention will be described in detail with reference to the accompanying drawings so that those of ordinary skill in the art may easily implement the present invention. However, the present invention may be implemented in various forms and is not limited to the embodiments described herein. In the drawings, parts irrelevant to the description are omitted in order to clearly describe the present invention, and like reference numerals refer to like elements throughout the specification.

1. Battery Pack According to Embodiment of Present Invention

The battery pack 10 according to an embodiment of the present invention includes a case 200 in which a plurality of battery cells are accommodated, and a BMS 100 for detecting damage to the case.

1-1) BMS 100

The BMS 100 includes a voltage output terminal 110 for outputting a predetermined voltage, a ground terminal 120, and a voltage measurement terminal 130 for measuring a voltage.

Meanwhile, the BMS 100 according to an embodiment of the present invention includes a battery management function performed by the conventional BMS 100 and may additionally detect damage to the case 200.

1-2) Case 200

The case 200 is a space in which a plurality of battery cells are mounted, and may be formed of a metal or plastic material.

Meanwhile, the case 200 may include a conductive member 210 in which one end is connected to the voltage output terminal 110 of the BMS 100 and the other end is connected to the ground terminal 120 of the BMS 100 and a sensing wire 220 in which one end is connected to the conductive member 210 and the other end is connected to the voltage measurement terminal 130 of the BMS.

1-2-1) Conductive Member 210

The conductive member 210 may be provided between one surface inside the case 200 and the other surface opposite to the one surface.

Since the case 200 is provided between the inner surface of the case 200 and the other surface as described above, it is possible to detect a case where a deformation in which the case 200 is bent inward due to an external impact occurs.

Specifically, when the case 200 is bent inward, the conductive member 210 is disconnected, and as a result, the voltage measured through the sensing wire 220 to be described later varies.

For example, the conductive member 210 may have a type in which the first conductive member 211 and the second conductive member 212 are connected in series. In addition, the first conductive member 211 and the second conductive member 212 may have the same resistance. In relation to the conductive member 210 composed of the first and second conductive members 211 and 212, if the case bends inward, since the portion connected to the first conductive member 211 and the second conductive member 212 is disconnected, the total resistance of the conductive member 210 is different, so that the voltage measured by the sensing wire 220 is different.

Meanwhile, the outside of the conductive member 210 may be sealed with an insulating material.

This is to prevent the occurrence of a short circuit when the conductive member 210 contacts another metal material inside the case 200.

Meanwhile, a first spring 230 may be provided between the conductive member 210 and one surface of the case 200, and a second spring 232 may be provided between the other end of the conductive member and the other surface of the case.

As described above, the first and second springs 230 and 232 are intended to provide a margin for detecting damage to the case 200. Specifically, even if the case 200 is bent inward to some extent due to an external impact, as the first and second springs 230 and 232 are contracted, it is possible to prevent the conductive member 210 from being broken due to small bending.

1-2-2) Sensing Wire 220

One end 221 of the sensing wire 220 is electrically connected to the conductive member 210, and the other end is connected to the voltage measurement terminal 130 of the BMS 100.

For example, one end 221 of the sensing wire 220 may be positioned at the center of the conductive member 210 or between the first conductive member 211 and the second conductive member 212.

However, the present invention is not limited thereto, and one end 221 of the sensing wire 220 may be positioned anywhere as long as it is electrically connected to the conductive member 210.

Hereinafter, a voltage applied to the sensing wire according to the position of the sensing wire 220 will be described with reference to FIG. 2.

Figure 2:
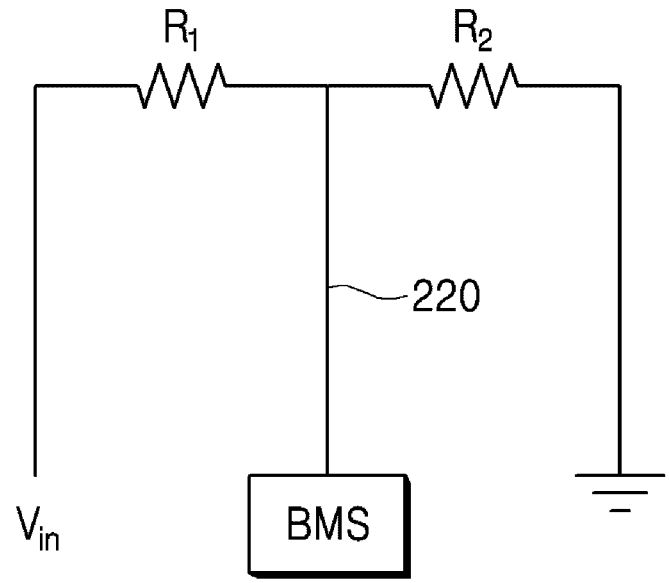
FIG. 2 is a diagram showing an equivalent circuit of a battery pack according to an embodiment of the present invention.
Figure 2:
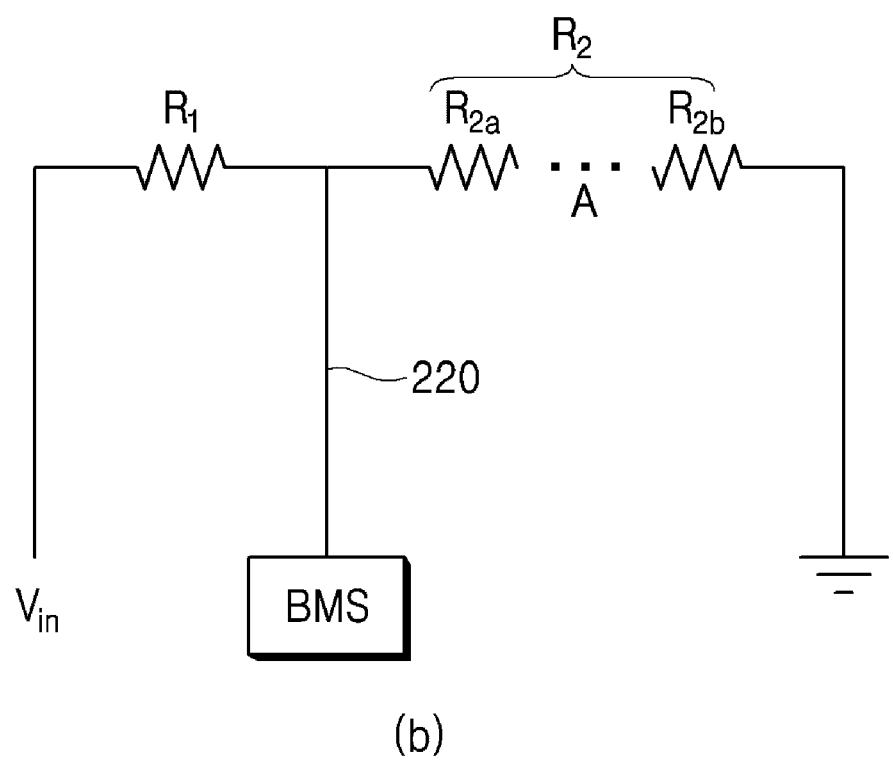

For example, as shown in (a) of FIG. 2, the resistance of the first conductive member 211 may be R1, the resistance of the second conductive member 212 may be R2, and the predetermined voltage outputted from the voltage output terminal 110 of the BMS 100 may be $V_{in}$. In this case, when there is no damage to the battery pack case, the reference voltage $V_{ref}$ applied to the sensing wire 220 is calculated by (Equation 1):

$$V_{ref} = V_{in} * \frac{R_2}{R_1 + R_2}. \quad \text{(Equation 1)}$$

$$V_{ref} = \frac{V_{in}}{\frac{R_1}{R_1 + R_2}}.$$

($V_{in}$=voltage outputted from the voltage output terminal, $R_1$=resistance of the first conductive member, $R_2$=resistance of the second conductive member).

In this way, when there is no damage to the battery pack case, the voltage $V_{ref}$ applied to the sensing wire 220 becomes a reference value for determining whether the battery pack case is damaged.

Meanwhile, when damage to the battery pack case occurs and one location of the conductive member 210 is broken, or when there is no damage to the battery pack case, a voltage different from the voltage applied to the sensing wire may be applied.

For example, when the point 'A' is cut off as shown in (b) of FIG. 2, the voltage $V_c$ applied to the sensing wire 220 is calculated by (Equation 2)

$$V_c = V_{in} * \frac{R_2}{R_1 + R_2}. \quad \text{(Equation 2)}$$

$$V_c = \frac{V_{in}}{\frac{R_1}{R_1 + R_2}}.$$

($V_{in}$=voltage outputted from the voltage output terminal, $R_1$=resistance of the first conductive member, $R_2$=resistance of the second conductive member).

In another example, when the sensing wire 220 is located at the center of the conductive member 210 or between the first conductive member 211 and the second conductive member 212 which are identical to each other, and when the conductive member 210 is not broken, $V_{in}/2$, which is a voltage corresponding to half of the predetermined voltage $V_{in}$ applied to one end of the conductive member 210, is applied to the sensing wire 220.

On the other hand, when the portion where the first conductive member 211 and the second conductive member 212 are connected is disconnected, and the sensing wire 220 is connected only to the first conductive member 211, the entire predetermined voltage $V_{in}$ applied to the conductive member 210 may be applied to the sensing wire 220. On the other hand, when the connection between the first conductive member 211 and the second conductive member 212 is disconnected, and the sensing wire 220 is connected only to the second conductive member 212, 0 V may be applied to the sensing wire 220.

Meanwhile, in the above-described example, the case where the voltage applied to the sensing wire 220 is described when the sensing wire 220 is located at the center of the conductive member 210 or between the first conductive member 211 and the second conductive member 212 that are the same as each other, but the present invention is not limited thereto. The voltage applied to the sensing wire 220 may vary in magnitude according to a position where the sensing wire 220 is connected to the conductive member 210.

Meanwhile, the voltage applied to the sensing wire 220 may be measured at the voltage measurement terminal 130 of the BMS.

For example, the BMS 100 measures the voltage applied to the above-described sensing wire 200 from the voltage measurement terminal 130 of the BMS, and determines whether the case is damaged based on this.

2) Case Damage Determination in BMS

In relation to the BMS, when the voltage received from the voltage measurement terminal 130 of the above-described BMS satisfies the following (Equation 1), it is determined that there is no damage to the battery pack case 200, and when the voltage received from the voltage measurement terminal 130 of the BMS does not satisfy (Equation 1) below the predetermined voltage outputted from the voltage output terminal 110 of the BMS, it is determined that there is damage to the battery pack case:

$$V_{ref} = V_{in} * \frac{R_2}{R_1 + R_2}. \quad \text{(Equation 1)}$$

$$V_{ref} = \frac{V_{in}}{\frac{R_1}{R_1 + R_2}}.$$

($V_{in}$=voltage outputted from the voltage output terminal, $R_1$=resistance of the first conductive member, $R_2$=resistance of the second conductive member).

As the reason for this determination is as described in the configuration of the sensing wire 220, because the sensing wire 220 is electrically connected to the conductive member 210, when there is no damage to the battery pack case 200, the voltage applied to the sensing wire and damage to the battery pack case 200 occur, this is because the voltage applied to the sensing wire 200 varies depending on the location where the damage occurs.

Specifically, referring to (b) of FIG. 2, the voltage $V_e$ applied to the sensing wire 200 according to the location where the damage occurs may be calculated according to the following (Equation 2):

$$V_c = V_{in} * \frac{R_2}{R_1 + R_2}. \quad \text{(Equation 2)}$$

$$V_c = \frac{V_{in}}{\frac{R_1}{R_1 + R_2}}.$$

($V_{in}$=voltage outputted from the voltage output terminal, $R_1$=resistance of the first conductive member, $R_2$=resistance of the second conductive member).

That is, the voltage applied to the sensing wire 220 varies depending on the position where the conductive member 210 is broken.

Meanwhile, the battery pack according to an embodiment of the present invention may be mounted on a device and used as a power supply source for the device.

For example, the device may be any one selected from the group consisting of a mobile phone, a tablet computer, a notebook computer, a computer, a power tool, a wearable electronic device, an electric vehicle, a hybrid electric vehicle, a plug-in hybrid electric vehicle, and a power storage device.

2. Case Damage Detection Method According to Embodiment of Present Invention

The method for detecting case damage according to an embodiment of the present invention is performed in the battery pack according to the embodiment of the present invention.

Figure 3:
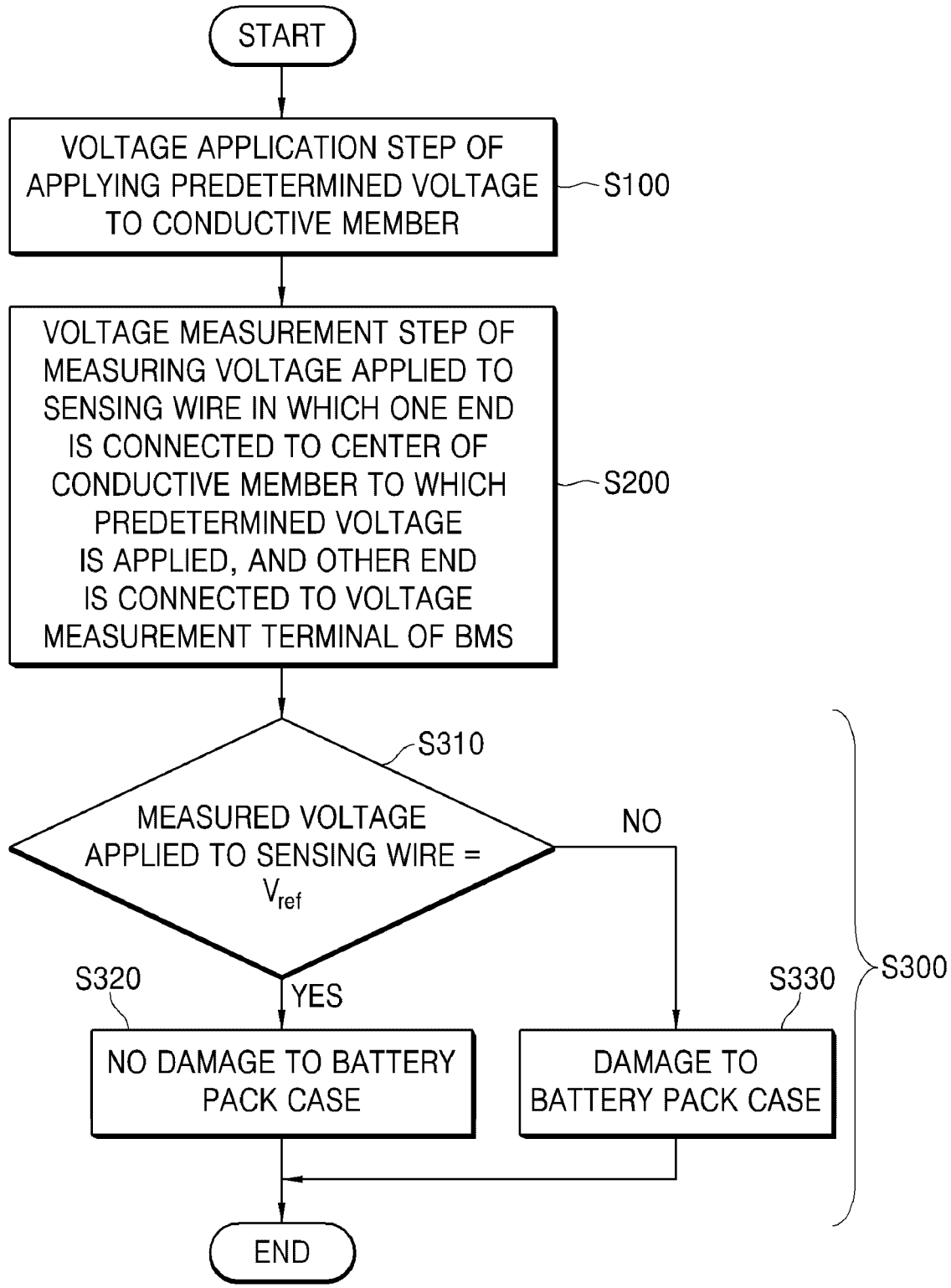
FIG. 3 is a flowchart illustrating a case damage detection method of a battery pack according to an embodiment of the present invention.

FIG. 3 is a flowchart illustrating a method for detecting damage to a case according to an embodiment of the present invention. Hereinafter, a case damage detection method according to an embodiment of the present invention will be described with reference to FIG. 3.

The case damage detection method according to an embodiment of the present invention includes a voltage application step S100 of applying a predetermined voltage to the conductive member in the BMS, a voltage measurement step S200 of measuring the voltage applied to the sensing wire in which one end is connected to the center of the conductive member to which the predetermined voltage is applied, and the other end is connected to the voltage measurement terminal of the BMS in the BMS, and a case damage determination step S300 of determining whether the battery pack is damaged based on the measured voltage.

2-1) Voltage Application Step S100

The voltage application step S100 is to measure a voltage in the voltage measurement step to be described later by applying a predetermined voltage from the voltage output terminal of the BMS to a conductive member.

2-2) Voltage Measurement Step S200

The voltage measurement step S200 is a process for measuring a voltage applied to a sensing wire provided at the center of a conductive member, and the measured voltage becomes a criterion for determining whether the case is damaged in the case damage determination step described later.

2-3) Case Damage Determination Step S300

In relation to the case damage determination step S300, when the voltage measured in the voltage measurement step S200 is compared S310, and the voltage measured in the voltage measurement step S200 is the same as the reference voltage $V_{ref}$ calculated through (Equation 1) below, it may be determined that there is no damage to the battery pack S320, and when the voltage measured in the voltage measurement step is different from the reference voltage $V_{ref}$ calculated through Equation 1 below, it may be determined that there is damage to the battery pack S330.

$$V_{ref} = V_{in} * \frac{R_2}{R_1 + R_2}. \quad \text{(Equation 1)}$$

$$V_{ref} = \frac{V_{in}}{\frac{R_1}{R_1 + R_2}}.$$

($V_{in}$=voltage outputted from the voltage output terminal, $R_1$=resistance of the first conductive member, $R_2$=resistance of the second conductive member).

For example, when the sensing wire is located at the center of the conductive member or between the same first conductive member and the second conductive member, if the conductive member is not broken, a voltage corresponding to half of the predetermined voltage applied to one end of the conductive member by Equation 1 is applied to the sensing wire.

However, when the conductive member is cut off as the case is bent inward, the voltage applied to the sensing wire varies.

Specifically, referring to (b) of FIG. 2, the voltage applied to the sensing wire 200 according to the location where the damage occurs may be calculated according to the following (Equation 2):

$$V_c = V_{in} * \frac{R_2}{R_1 + R_2}. \quad \text{(Equation 2)}$$

$$V_c = \frac{V_{in}}{\frac{R_1}{R_1 + R_2}}.$$

($V_{in}$=voltage outputted from the voltage output terminal, $R_1$=resistance of the first conductive member, $R_2$=resistance of the second conductive member).

That is, the voltage applied to the sensing wire 220 varies depending on the position where the conductive member 210 is broken.

On the other hand, when the portion where the first conductive member and the second conductive member are connected is disconnected, and the sensing wire is connected only to the first conductive member, the entire predetermined voltage applied to the conductive member may be applied. On the other hand, when the first conductive member and the second conductive member connected in series are disconnected and the sensing wire is connected only to the second conductive member, 0 V may be applied.

Meanwhile, in the above-described example, it is described that the voltage applied to the sensing wire is described when the sensing wire is located at the center of the conductive member or between the same first conductive member and the second conductive member, but the present invention is not limited thereto.

As for the voltage measured by the sensing wire, the magnitude of the voltage applied to the sensing wire may vary depending on the position where the sensing wire is connected to the conductive member.

On the other hand, although the technical idea of the present invention has been specifically described according to the above embodiment, it should be noted that the above embodiments are for the purpose of explanation and not limitation. In addition, those skilled in the art in the technical field of the present invention will be able to understand that various embodiments are possible within the scope of the spirit of the present invention.

What is claimed is:

1. A battery pack comprising:
   a case accommodating a plurality of battery cells; and
   a battery management system (BMS) configured to detect damage to the case,
   wherein the BMS comprises:
      a voltage output terminal configured to output a predetermined voltage;
      a ground terminal; and
      a voltage measurement terminal configured to measure voltage,
   wherein the case comprises:
      a conductive member having a first end connected to the voltage output terminal of the BMS and a second end connected to the ground terminal of the BMS; and
      a sensing wire having a first end connected to the conductive member and a second end connected to a voltage measurement terminal of the BMS, and
   wherein the conductive member is provided between a first surface inside the case and a second surface opposite to the first surface.

2. The battery pack of claim 1, wherein in the conductive member, a first conductive member and a second conductive member identical to each other are connected in series.

3. The battery pack of claim 2, wherein the first end of the sensing wire is positioned between the center of the conductive member or between the first conductive member and the second conductive member.

4. The battery pack case of claim 1, wherein the conductive member is sealed with an insulating material.

5. The battery pack of claim 1, wherein a first spring is provided between the first end of the conductive member and a first surface of the case,
wherein a second spring is provided between the second end of the conductive member and the second surface of the case.

6. The battery pack of claim 3, wherein in response to a voltage $V_c$ received from the voltage measurement terminal of the BMS being equal to a reference voltage $V_{ref}$, the BMS determines that there is no damage to a battery pack case, and
in response to the voltage $V_c$ received from the voltage measurement terminal of the BMS being different from the reference voltage $V_{ref}$, the BMS determines that there is damage to the battery pack case, and
wherein the reference voltage $V_{ref}$ is calculated by the following (Equation):

$$V_{ref} = V_{in} * \frac{R_2}{R_1 + R_2}$$ (Equation)

$$V_{ref} = \frac{V_{in}}{\frac{R_1}{R_1 + R_2}}.$$

($V_{in}$=voltage outputted from the voltage output terminal, $R_1$=resistance of the first conductive member, $R_2$=resistance of the second conductive member).

7. A device comprising the battery pack according to claim 1.

8. The device of claim 7, wherein the device is any one selected from the group consisting of a mobile phone, a tablet computer, a notebook computer, a power tool, a wearable electronic device, an electric vehicle, a hybrid electric vehicle, a plug-in hybrid electric vehicle, and a power storage device.

* * * * *